United States Patent
Edler et al.

(10) Patent No.: US 10,836,504 B2
(45) Date of Patent: Nov. 17, 2020

(54) PASSIVE PARTICLE SEPARATION SYSTEM

(71) Applicant: Bell Helicopter Textron Inc., Fort Worth, TX (US)

(72) Inventors: Joshua Allan Edler, Dallas, TX (US); Brent Scannell, L'ile-Bizard (CA); Thomas Mast, Carrollton, TX (US); Sarah R. Villanueva, Stillwater, OK (US); David Michael Tiedeman, Hurst, TX (US); Keith C. Pedersen, North Richland Hills, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 275 days.

(21) Appl. No.: 15/963,911

(22) Filed: Apr. 26, 2018

(65) Prior Publication Data
US 2019/0329899 A1    Oct. 31, 2019

(51) Int. Cl.
*B01D 39/00* (2006.01)
*B64D 33/02* (2006.01)
(Continued)

(52) U.S. Cl.
CPC ............ *B64D 33/02* (2013.01); *B01D 45/06* (2013.01); *B01D 45/16* (2013.01); *B64D 13/06* (2013.01); *B64D 29/06* (2013.01); *B60J 5/108* (2013.01); *B62D 33/0273* (2013.01); *B64C 27/04* (2013.01); *B64C 27/06* (2013.01); *B64D 2013/0651* (2013.01); *B64D 2033/0246* (2013.01); *B64D 2241/00* (2013.01); *F02C 7/052* (2013.01)

(58) Field of Classification Search
CPC ........ B64D 33/02; B64D 29/06; B64D 13/06; B64D 2241/00; B64D 2033/0246; B64D 2013/0651; B01D 45/16; B01D 45/06; F02C 7/052; B60J 5/108; B62D 33/0273; B64C 27/04; B64C 27/06
See application file for complete search history.

(56) References Cited

U.S. PATENT DOCUMENTS 2,057,555 A    10/1936    Clark et al.
2,362,552 A    11/1944    Heymann
(Continued)

FOREIGN PATENT DOCUMENTS

EP    2617648 A1    7/2013
EP    3059157 A1    8/2016
(Continued)

OTHER PUBLICATIONS

EPO Search Report issued in EP Application No. 18184586.8 dated Jan. 17, 2019, 5 pages.
(Continued)

*Primary Examiner* — Dung H Bui
(74) *Attorney, Agent, or Firm* — Patent Capital Group

(57) ABSTRACT

One embodiment is a passive particle separation system including a plenum; an inlet for feeding outside air into the plenum, wherein the outside air has particles entrained therewith; a housing for enclosing the plenum; and a standpipe installed on the housing. The outside air enters the plenum via the inlet and plenum, housing, and standpipe interact to impact the outside air entering the plenum to cause the particles to be released from the outside air.

15 Claims, 10 Drawing Sheets

(51) Int. Cl.

| | |
|---|---|
| *B64D 13/06* | (2006.01) |
| *B64D 29/06* | (2006.01) |
| *B01D 45/16* | (2006.01) |
| *B01D 45/06* | (2006.01) |
| *F02C 7/052* | (2006.01) |
| *B62D 33/027* | (2006.01) |
| *B64C 27/06* | (2006.01) |
| *B60J 5/10* | (2006.01) |
| *B64C 27/04* | (2006.01) |

(56) References Cited

U.S. PATENT DOCUMENTS

| | | | |
|---|---|---|---|
| 3,004,303 | A | 10/1961 | Wilmer |
| 3,063,747 | A | 11/1962 | Anderson |
| 3,247,892 | A | 4/1966 | Harmon |
| 3,421,296 | A * | 1/1969 | Beurer, Sr. .............. F02C 7/052 55/306 |
| 3,449,891 | A * | 6/1969 | Armand ................ F02M 35/16 55/306 |
| 5,931,415 | A | 8/1999 | Lingard et al. |
| 6,155,520 | A | 12/2000 | Giraud et al. |
| 6,834,834 | B2 | 12/2004 | Dazet et al. |
| 2005/0178887 | A1 | 8/2005 | Beutin et al. |
| 2009/0045288 | A1 | 2/2009 | Nakamura et al. |
| 2009/0139191 | A1 | 6/2009 | Roundy et al. |
| 2010/0270423 | A1* | 10/2010 | Lauder ...................... B64C 1/00 244/17.19 |
| 2014/0260182 | A1* | 9/2014 | Suciu ........................ F02C 3/10 60/224 |
| 2016/0075439 | A1* | 3/2016 | Mores ................... B64D 33/02 244/53 B |
| 2018/0362175 | A1 | 12/2018 | Scannell et al. |

FOREIGN PATENT DOCUMENTS

| | | |
|---|---|---|
| EP | 3059157 B1 | 3/2018 |
| EP | 3418183 A1 | 12/2018 |
| EP | 3560837 B1 | 4/2020 |
| FR | 2642662 A1 | 8/1990 |
| GB | 1201096 A | 8/1970 |
| WO | 2010077241 A1 | 7/2010 |

OTHER PUBLICATIONS

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).

Mueller Environmental Designs Inc., Fred Mueller, President, "Fundamental of Gas Solids/Liquids Separation," printed on Apr. 12, 2018, 15 pages; http://www.muellerenvironmental.com/.

Perry, Dominic, "Analysis: Bell 525 Relentless Cutaway and Technical Description", Flight Global, Flight International, Bell Helicopter, Published Nov. 12, 2014. (8 pages).

EPO Examining Division Examination Report issued in EP Application No. 18184586.8 dated Jul. 2, 2019, 4 pages.

EPO Examination Report issued in EP Application No. 18184586.8 dated Feb. 8, 2019, 6 pages.

EPO Examination Report issued in EP Application 17195407.6 dated May 28, 2018, 6 pages.

EPO Examination Report issued in EP Application 17195407.6 dated Oct. 4, 2018, 4 pages.

EPO Search Report issued in EP Application 17195407.6 dated May 9, 2018, 4 pages.

USPTO Non-Final Office Action for U.S. Appl. No. 15/627,393 dated Mar. 5, 2020, 7 pages.

* cited by examiner

PASSIVE PARTICLE SEPARATION SYSTEM

TECHNICAL FIELD

This disclosure relates generally to rotorcraft and, more particularly, to a passive particle separation system for such rotorcraft.

BACKGROUND

Some rotorcrafts utilize outside air for a variety of systems, including, for example, propulsion related components, engines, auxiliary power units (APU), environmental control units (ECU), vapor cycle air conditioning components, ventilation, hydraulic, and avionics cooling. It is undesirable to allow particles and water into the aircraft or aircraft environment control system, so means to limit passage of particles and water may be provided. Other components that utilize outside air for cooling and then exhaust the air overboard the aircraft rather than into the fuselage may also benefit from particle separation. It is difficult to implement particle separation in this type of system because the inertia and other forces exerted by the inlet air is normally reduced, which in turn tends to reduce the cooling efficiency.

SUMMARY

One embodiment is a passive particle separation system including a plenum; an inlet for feeding outside air into the plenum, wherein the outside air has particles entrained therewith; a housing for enclosing the plenum; and a standpipe installed on the housing. The outside air enters the plenum via the inlet and plenum, housing, and standpipe interact to impact the outside air entering the plenum to cause the particles to be released from the outside air.

The standpipe may include a filter through which the outside air is drawn into the standpipe and trash trap may be disposed at the base of the housing around the standpipe for accumulating particles released from the outside air. In some embodiments, the standpipe may be removable. The passive particle separation system may include a consumer system inlet duct through which the outside air from which particles have been separated exits the passive particle separation system into a consumer system. A drain may be disposed at a bottom of the plenum proximate the standpipe and a seal may be disposed at a base of the standpipe.

In some embodiments, the passive particle separation system may be installed on a first aircraft fairing and the first aircraft fairing may be pivotably attached to a fixed aircraft fairing. The inlet may comprise a National Advisory Council on Aeronautics ("NACA") type flush low-pressure inlet.

Another embodiment is a rotorcraft including a first fairing and a passive particle separation system installed on the first fairing. The passive particle separation system includes a plenum; an inlet for feeding outside air into the plenum, wherein the outside air has particles entrained therewith; a housing for enclosing the plenum; and a standpipe installed on the housing. The outside air enters the plenum via the inlet and the plenum, housing, and standpipe interact to impact the outside air entering the plenum to cause the particles to be released from the outside air. Particles may also be released from the air solely by reduction in inertia. For example, some particles that have not impacted the walls do not have sufficient inertia to remain in the airstream as the air travels up toward the standpipe inlet. The passive particle separation system may further include a filter through which outside air is drawn into the standpipe and trash trap may be disposed at the base of the housing around the standpipe for accumulating particles released from the outside air. In some embodiments, the standpipe is removable.

The passive particle separation system further includes a consumer system inlet duct through which the outside air from which particles have been separated exits the passive particle separation system into a consumer system. The first fairing may be pivotably attached to a fixed fairing for articulation relative to the fixed fairing between a closed position and an open position.

Another embodiment is a fairing assembly for a rotorcraft, the fairing assembly including a first fairing affixed to an airframe of the rotorcraft, a second fairing hinged on the first fairing for articulation relative to the first fairing between a closed position and an open position, a passive particle separation system installed on the first fairing. The passive particle separation system includes a plenum, an inlet for feeding outside air into the plenum, wherein the outside air has particles entrained therewith, a housing for enclosing the plenum, and a standpipe installed on the housing. Outside air enters the plenum via the inlet and the plenum, housing, and standpipe interact to impact the outside air entering the plenum to cause the particles to be released from the outside air. The passive particle separation system may include a filter through which the outside air is drawn into the standpipe and a standpipe and trash trap may be disposed at the base of the housing around the standpipe for accumulating particles released from the outside air. The standpipe may be removable. The passive particle separation system may include a consumer system inlet duct through which the outside air from which particles have been separated exits the passive particle separation system into a consumer system.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
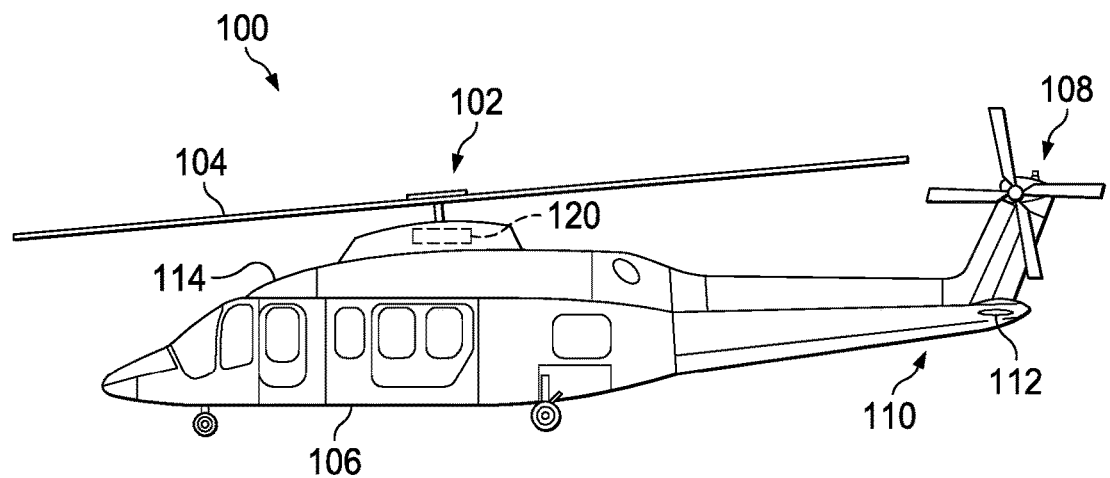
FIGS. 1-3 are simplified schematic diagrams of an example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, certain devices, components, members, apparatuses, etc. described herein may be positioned in other orientations. Thus, the use of terms such as 'above', 'below', 'upper', 'lower', 'top', 'bottom' or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 2:
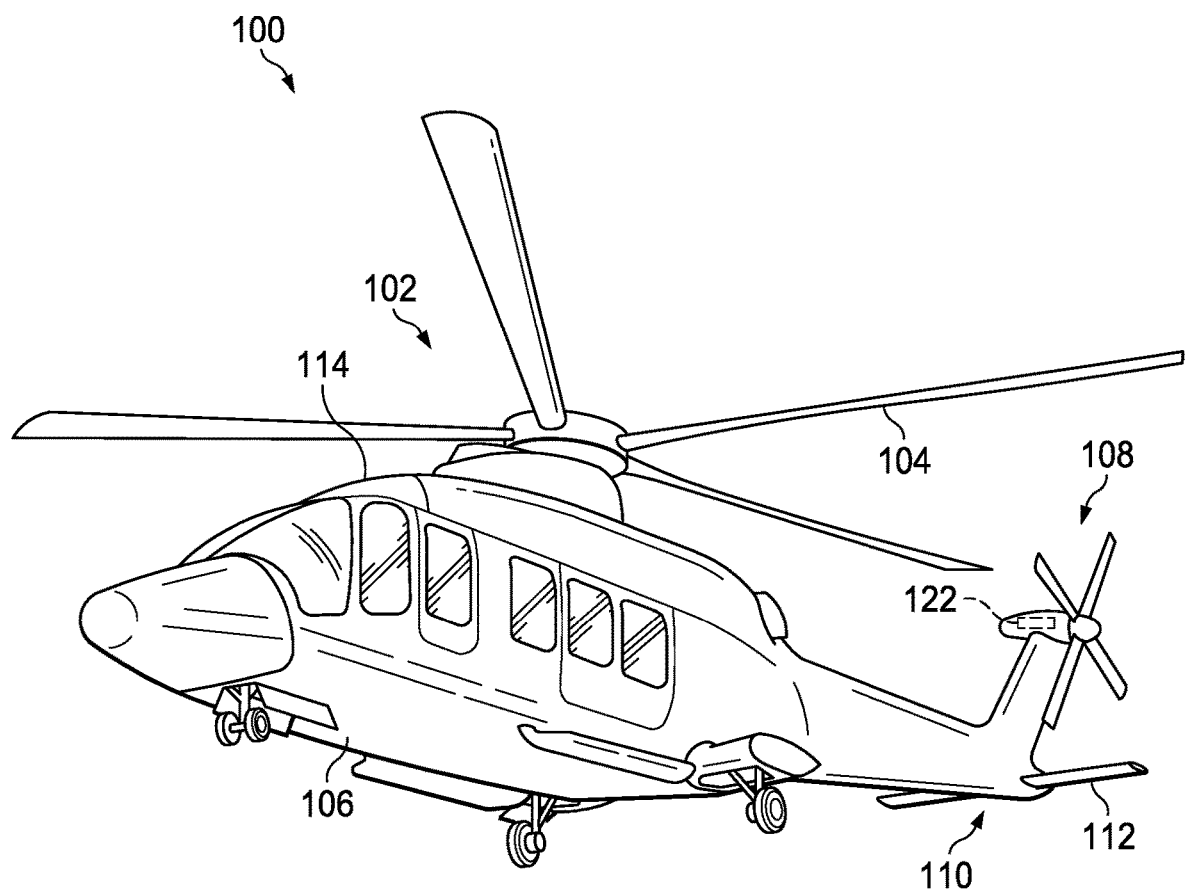

FIGS. 1-2 illustrate an example embodiment of a rotorcraft 100. FIG. 1 portrays a side view of rotorcraft 100, while FIG. 2 portrays an isometric view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, tail rotor or anti-torque system 108, an tail structure 110, and an empennage 112. In the illustrated embodiment, empennage 112 may be used as a horizontal stabilizer. Torque is supplied to rotor system 102 and anti-torque system 108 using at least one engine and at least one gearbox. At least one gearbox 120 associated with rotor system 102 is illustrated in the embodiment of FIG. 1. In some embodiments, anti-torque system 108 may also include an associated at least one gearbox 122, as illustrated in the embodiment of FIG. 2. The rotorcraft may also include a variety of fairings, which function as protective coverings for various components of the rotorcraft and reduce aerodynamic drag. One example fairing 114 arranged forward of an unillustrated engine may cover and protect, for example, an environmental control unit (ECU).

Figure 3:
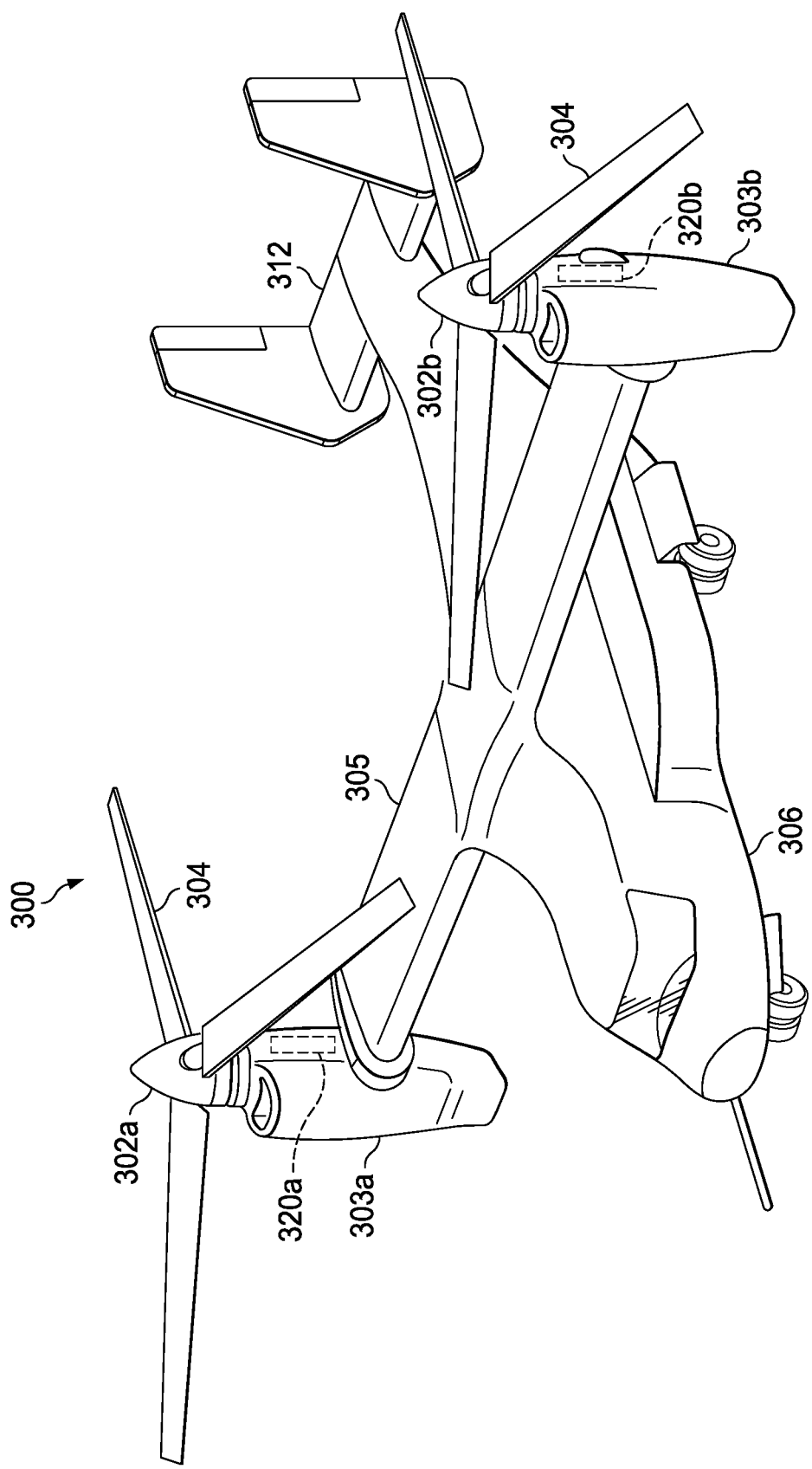

FIG. 3 illustrates a perspective view of an example tiltrotor aircraft 300.

Tiltrotor aircraft 300 includes nacelles 303a and 303b, a wing 305, a fuselage 306, and a tail structure 312. Nacelles 303a and 303b respectively include rotor systems 302a and 302b, and each rotor system 302a and 302b includes a plurality of rotor blades 304. Moreover, each nacelle 303a and 303b may include an engine and at least one gearbox 320a and 320b, respectively, for driving rotor systems 302a and 302b, respectively. In some embodiments, nacelles 303a and 303b may each be configured to rotate between a helicopter mode, in which the nacelles 303a and 303b are approximately vertical, and an airplane mode, in which the nacelles 303a and 303b are approximately horizontal. In the illustrated embodiment, tail structure 312 may be used as a vertical stabilizer.

It should be appreciated that rotorcraft 100 of FIGS. 1-2 and tiltrotor aircraft 300 of FIG. 3 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices, such as automobiles, for example.

As previously noted, aircraft have fairings over ECUs and most such fairings are removable to allow for maintenance of the ECU over which they are disposed. An ECU will have an inlet that penetrates the ECU fairing in order to provide fresh air to the ECU. Air entering the ECU inlet needs to undergo particle separation to reduce the amount of debris entering the ECU. It will be recognized that inlets and particle separation systems are bulky and may get in the way of maintenance. Additionally, nets and fairings typically have complicated shapes and the interfaces between them may also be complicated. Joints between fairings and components are typically dynamic, thereby adding to the complication. In accordance with features of embodiments described herein, the inlet and particle separator are integrated into the ECU fairing. As a result, the interface can be moved to a simpler joint between the particle separator and ECU and the inlet and particle separator are automatically moved out of the way when the fairing is open to facilitate maintenance of the ECU.

Figure 4A:
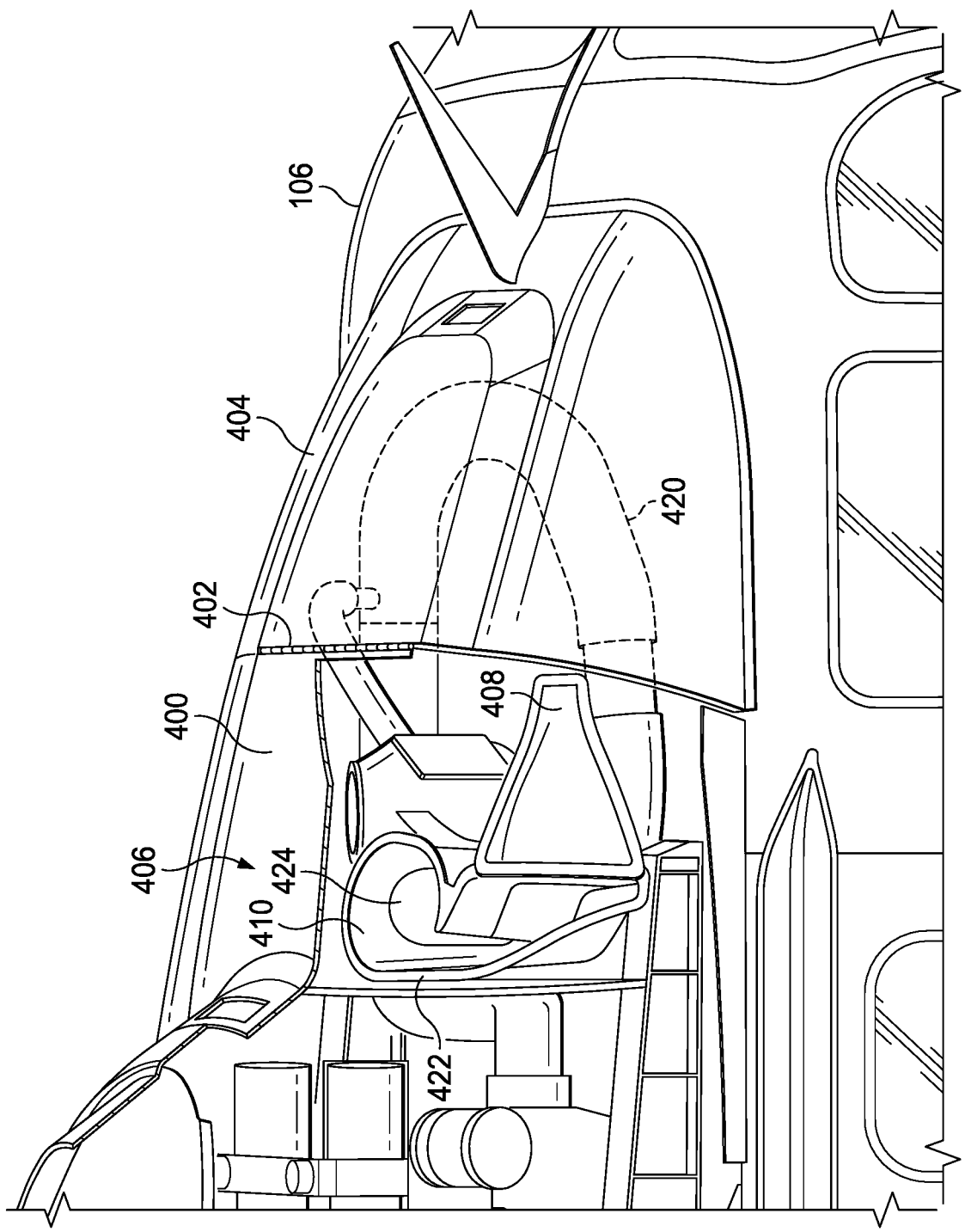
FIG. 4A is a perspective partially cutaway view of an example hinged fairing under which a fresh air inlet and passive particle separation system is disposed in accordance with embodiments described herein.

FIG. 4A shows in a perspective partially cutaway view of an example pivotable fairing 400 that is attached by a hinged connection 402 to a stationary forward fairing 404 that is in turn affixed to the fuselage 106 of the rotorcraft 100. As will be illustrated in greater detail with reference to the FIGURES described below, a passive particle separation system 406, along with other aircraft components, may be protectively covered by the fairings 400 and 404. The embodiments described throughout this disclosure provide numerous technical advantages. As shown in FIG. 4A, the system 406 intake includes a National Advisory Council on Aeronautics ("NACA") type flush low-pressure inlet 408 which feeds air into a plenum 410. An example inlet duct 420, which transports outside air with particles separated therefrom to the consumer system, is also shown.

Figure 4B:
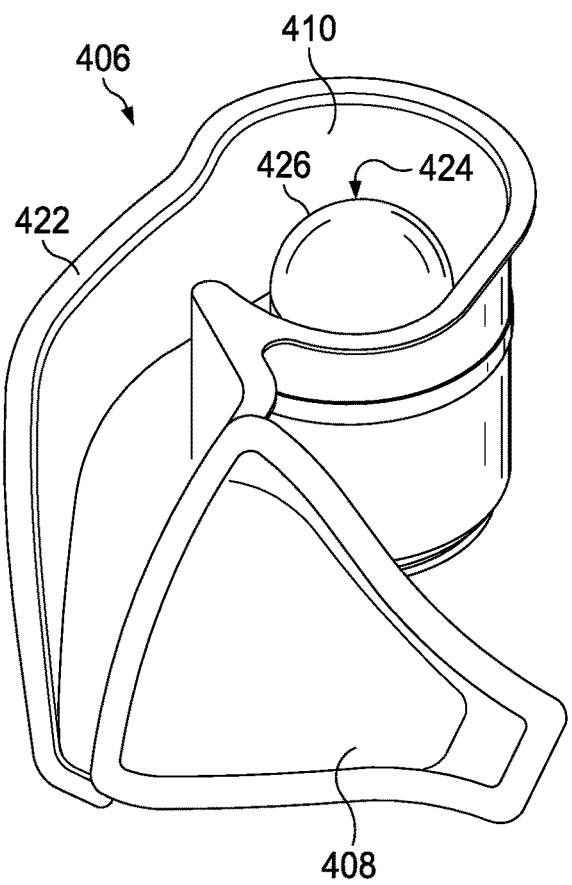
FIGS. 4B and 4C respectively illustrate isometric views of opposite sides of the particle separation system of FIG. 4A in accordance with embodiments described herein.
Figure 4C:
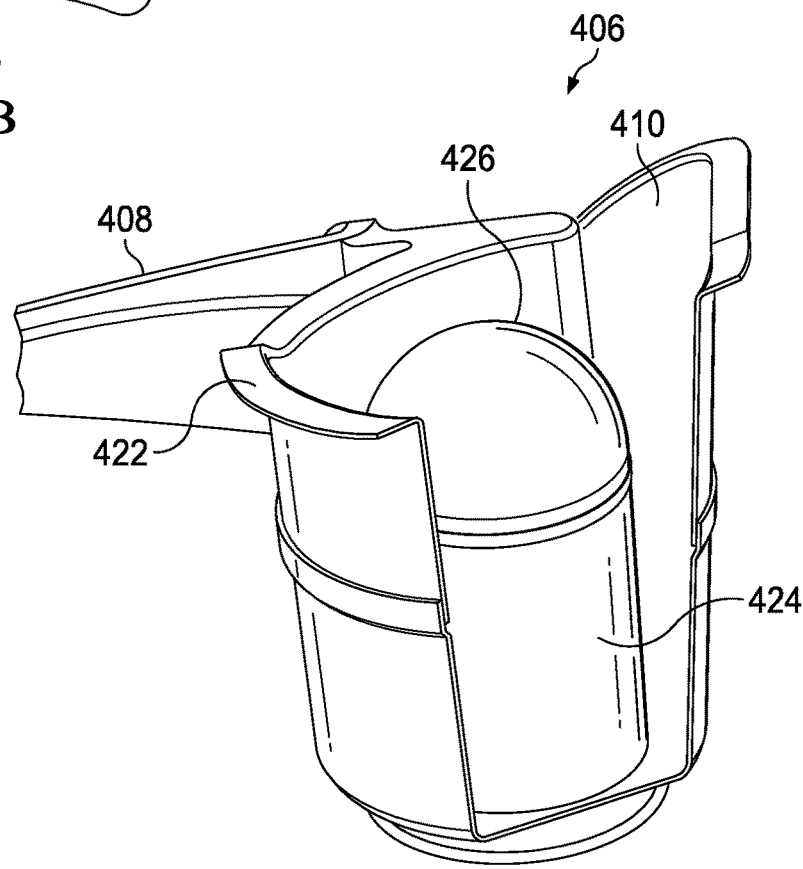

FIG. 4B illustrates an isometric view of a first side of the passive particle separation system 406. FIG. 4C illustrates an isometric and partially cutaway view of the opposite side of the passive particle separation system 406. Referring to FIGS. 4A-4C, an inlet outer housing 422 is provided for enclosing the plenum 410 and has installed thereon a standpipe 424, which may include a filter 426. As shown in FIGS. 4B and 4C, and as will be described in greater detail below, the outlet of the system 406 is fed through (i.e., drawn from) the top of the standpipe 424 through the filter 426. As will also be described in greater detail below, in accordance with features of embodiments described herein, any particulate matter or liquid (e.g., water) droplets (hereinafter collectively referred to as "particles") entrained in the air fall to the bottom of the area surrounding the standpipe 424, as well as an area upstream of the standpipe, and the air rises to the top of the area and enters the standpipe through the filter 426 to exit the system 406 through a consumer system inlet duct 420.

Figure 5A:
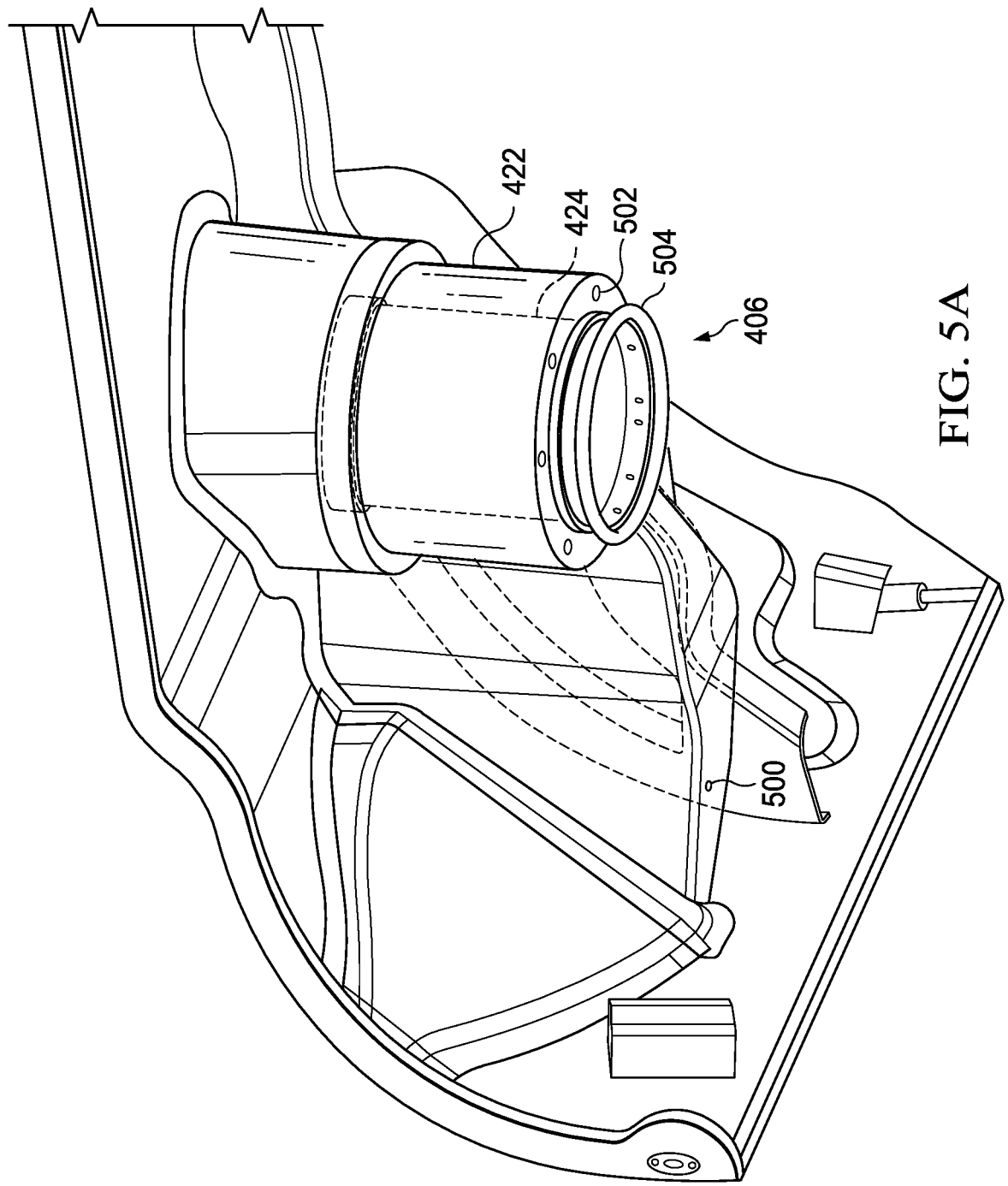
FIGS. 5A and 5B illustrate alternate views of the front and underside of the passive particle separation system attached to the hinged fairing shown in FIG. 4A in accordance with embodiments described herein.
Figure 5B:
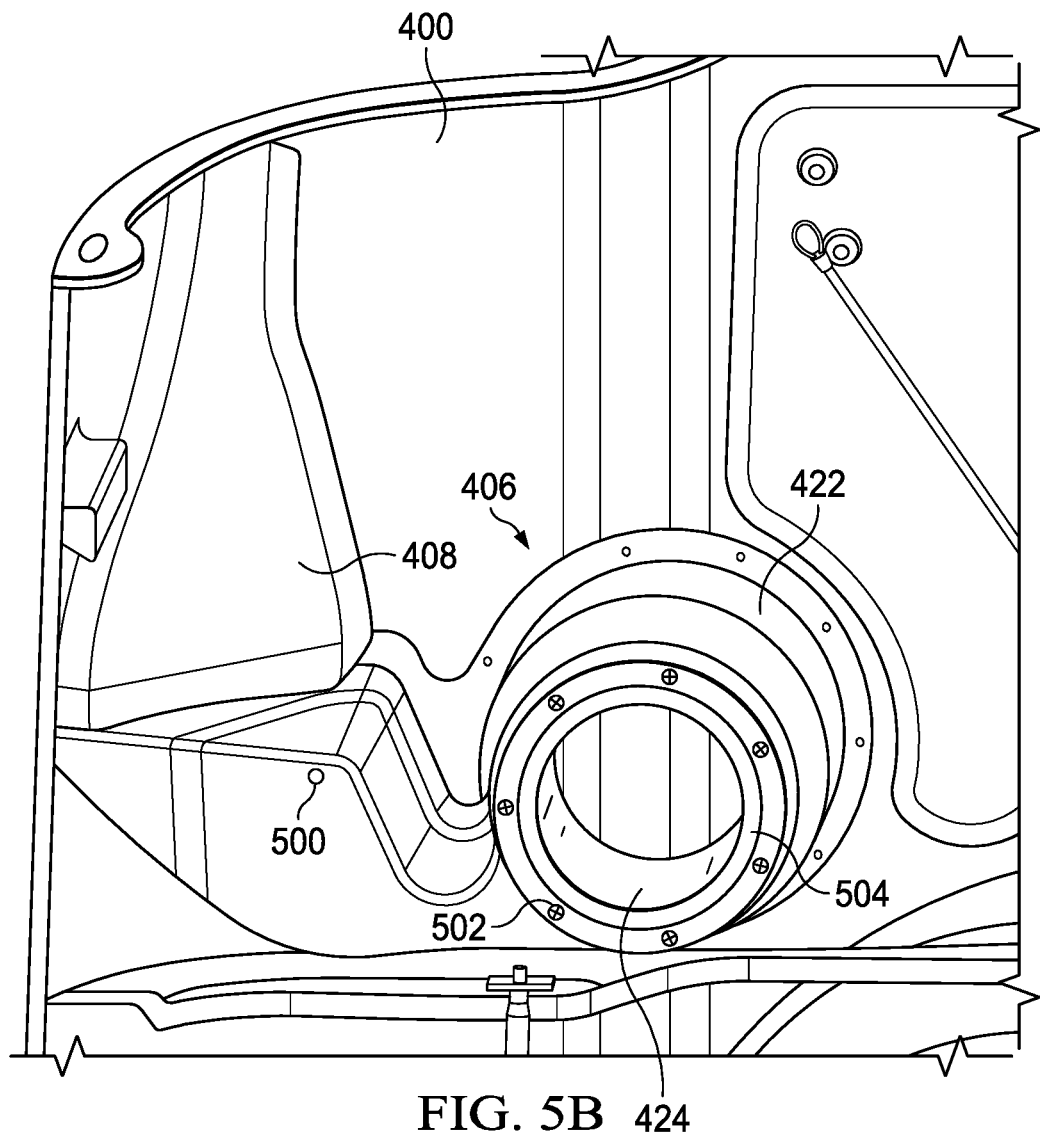

FIGS. 5A and 5B illustrate alternate views of the front and underside of the system 406, which may be attached to the fairing 400. As noted above, the standpipe 424 is installed on an inlet outer housing 422 that encloses the plenum 410. The inlet outer housing 422 also includes a drain 500. The standpipe 424 is removable (e.g., by removing fasteners 502) to allow for a trash trap disposed at the base of the housing to be accessed and debris removed therefrom. A seal 504 is disposed at the base of the standpipe 424 and may mate with consumer system inlet duct 420 to isolate underfairing air from the inlet air.

Figure 6:
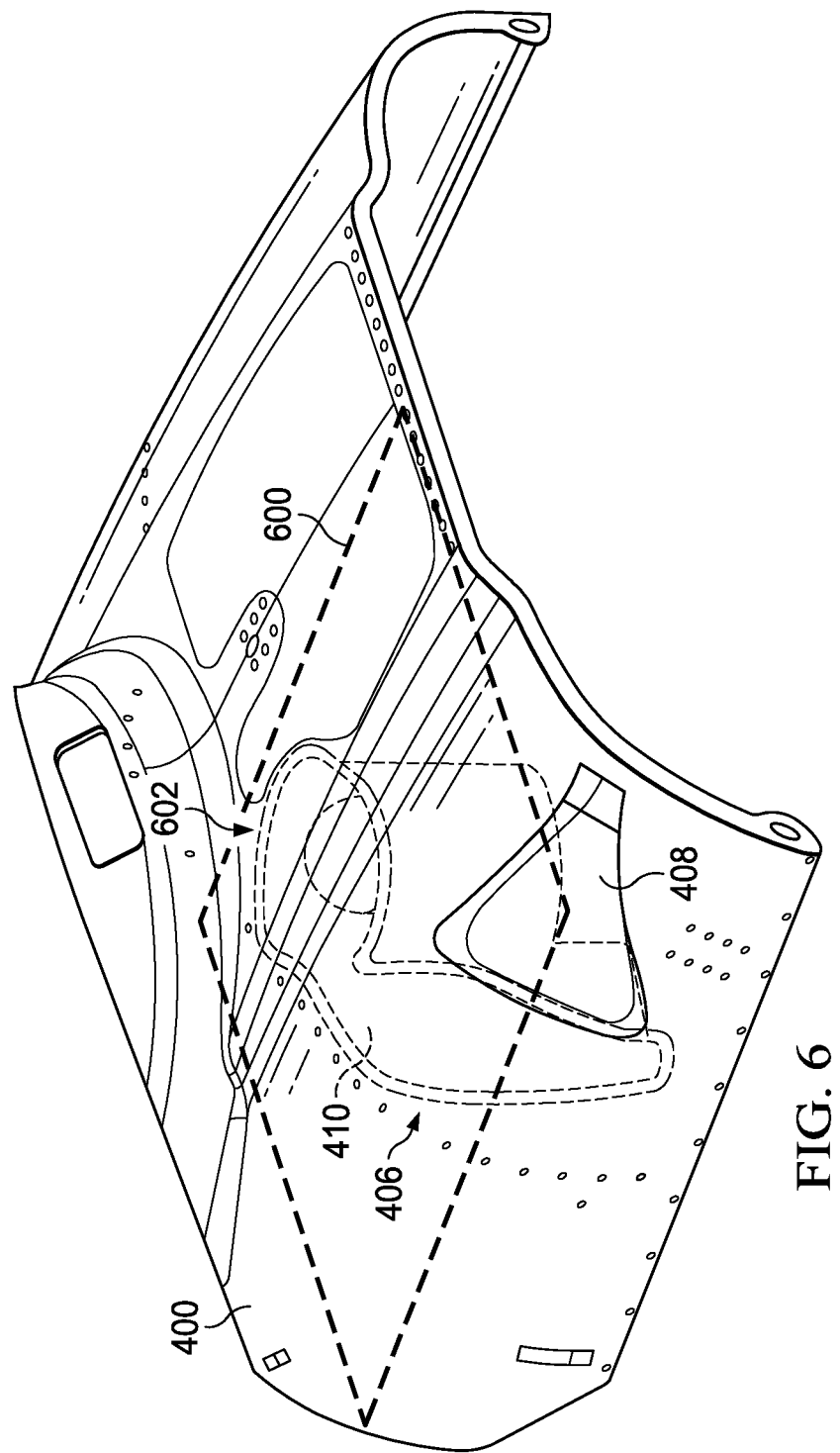
FIG. 6 is a perspective view of the hinged fairing of FIG. 4A illustrating an installation example of the passive particle separation system in accordance with embodiments described herein.

FIG. 6 is a perspective view of the hinged fairing 400 showing an installation example of the system 406. In the embodiment illustrated in FIG. 6, the system 406 is attached to, and moves with, the hinged fairing 400. A waterline plane 600 forms a section cut 602 of the system 406, a representation of which section is detailed in FIG. 7.

Figure 7:
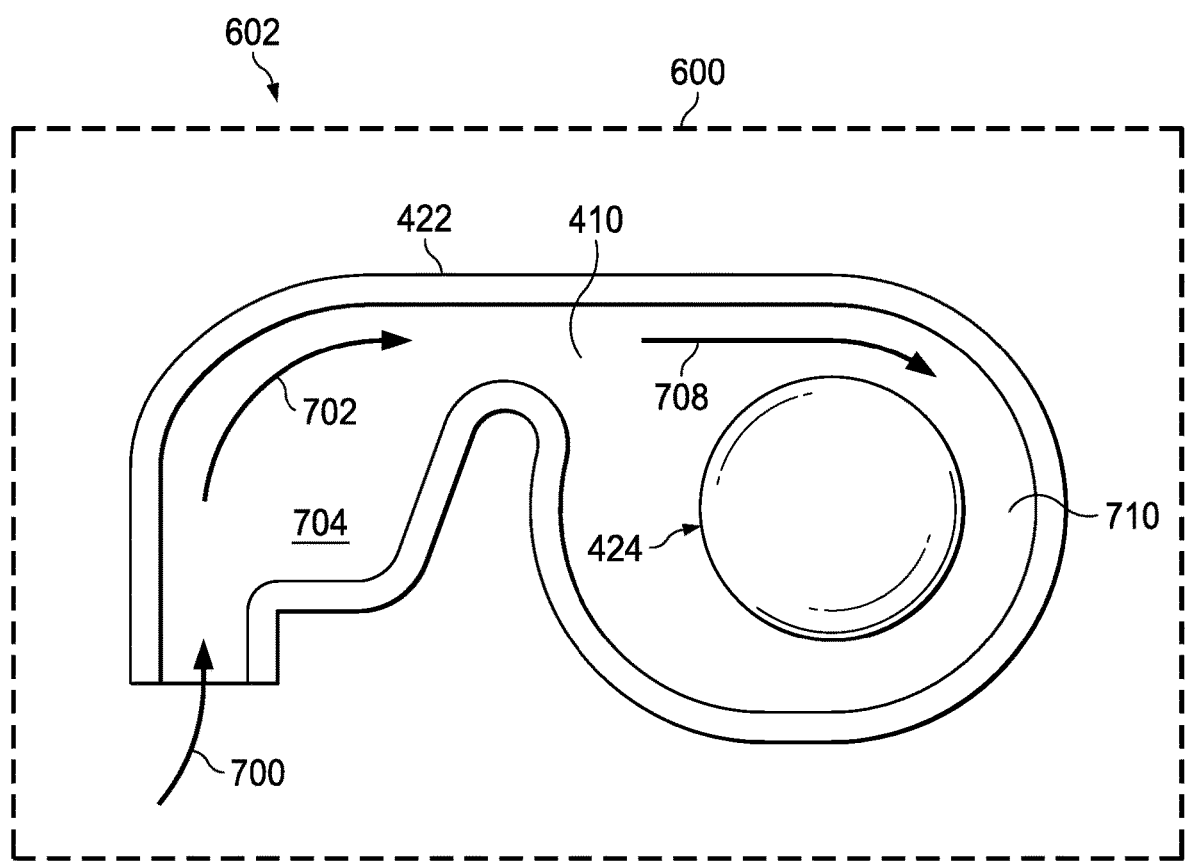
FIG. 7 is a top view of a section cut formed by a waterline plane illustrated in FIG. 6 in accordance with embodiments described herein.

FIG. 7 illustrates a top view of the section cut 602 formed by the waterline plane 600 illustrated in FIG. 6. The section cut 602 shown in FIG. 7 is used to illustrate the airflow path and operation of the 406 to passively separate particles from an incoming air stream. Referring to FIG. 7, outside air enters the plenum 410 of the outer housing 422 via the flush inlet 408, as represented by an arrow 700. It will be recognized that solid particulate matter and liquid (e.g., water) droplets (herein after collectively "particles") are entrained in the air as it enters the inlet 408 at least in part because the velocity of the incoming air imparts sufficient inertia and other forces (hereinafter collectively referred to as "inertia") to the particles for the particles to be carried along with the air. As represented by an arrow 702, the incoming air, including any particles entrained therewith, enters an area 704 of the plenum 410 that has a greater cross-sectional area than the flush inlet 408 opening. The entering air expands into the larger volume, which reduces air velocity and induces turbulence and recirculation into the flow. The inertia of particles entrained with the air is reduced as the entering air expands, slows, and becomes turbulent. Particles of a certain energy may no longer remain entrained with the air because their inertia is too small and these particles drop out of the airflow stream. The expanding inlet air must also change direction as it turns towards the standpipe 424, as represented by an arrow 708. This change of direction further reduces the inertia of the entrained particles. In addition, the direction change causes some higher inertia particles to impact a wall of the outer housing 422, which causes them to drop out of the airflow stream at that point. The air flow then continues into a cylindrical area 710 of the housing 422 around the standpipe 424, where it encounters additional direction changes. Rotation is also imparted to the airflow in this area. The direction changes and turbulence encountered by the airflow in the area surrounding the standpipe (i.e., area 710) causes particles to lose inertia through direction changes and collisions with the housing 422 or standpipe 424 in similar manner as in the area 704. The rotation of the airflow increases the propensity for particles to impact the housing 422 wall and has the effect of "spinning" the particles out of the airstream.

Figure 8:
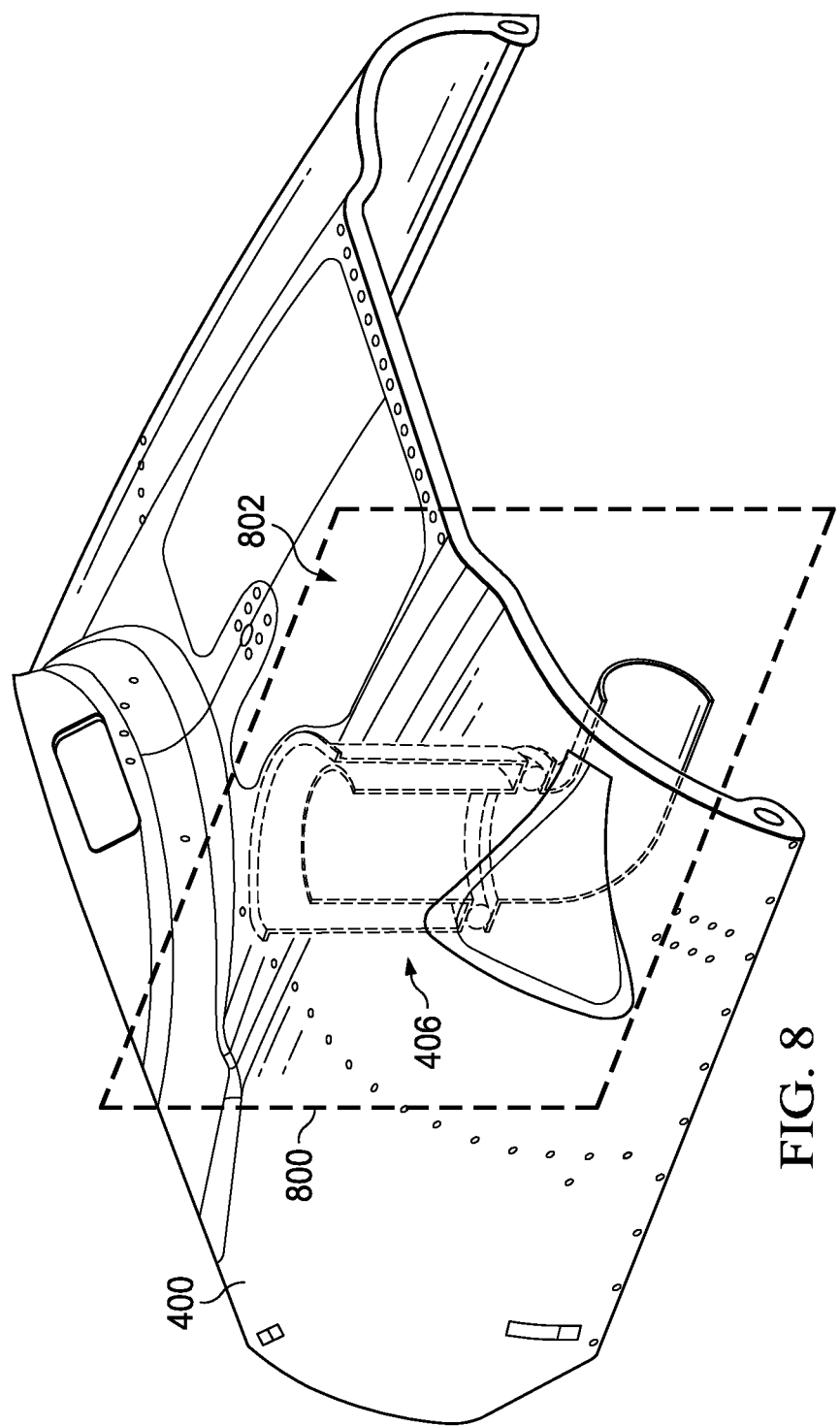
FIG. 8 is another perspective view of the hinged fairing of FIG. 4A illustrating an installation example of the passive particle separation system in accordance with embodiments described herein.

FIG. 8 illustrates a perspective view of the hinged fairing 400 including the system 406. As shown in FIG. 8, a butt line plane 800 forms a section cut 802 of the system 406, a representation of which section is described in greater details with reference to FIG. 9.

Figure 9:
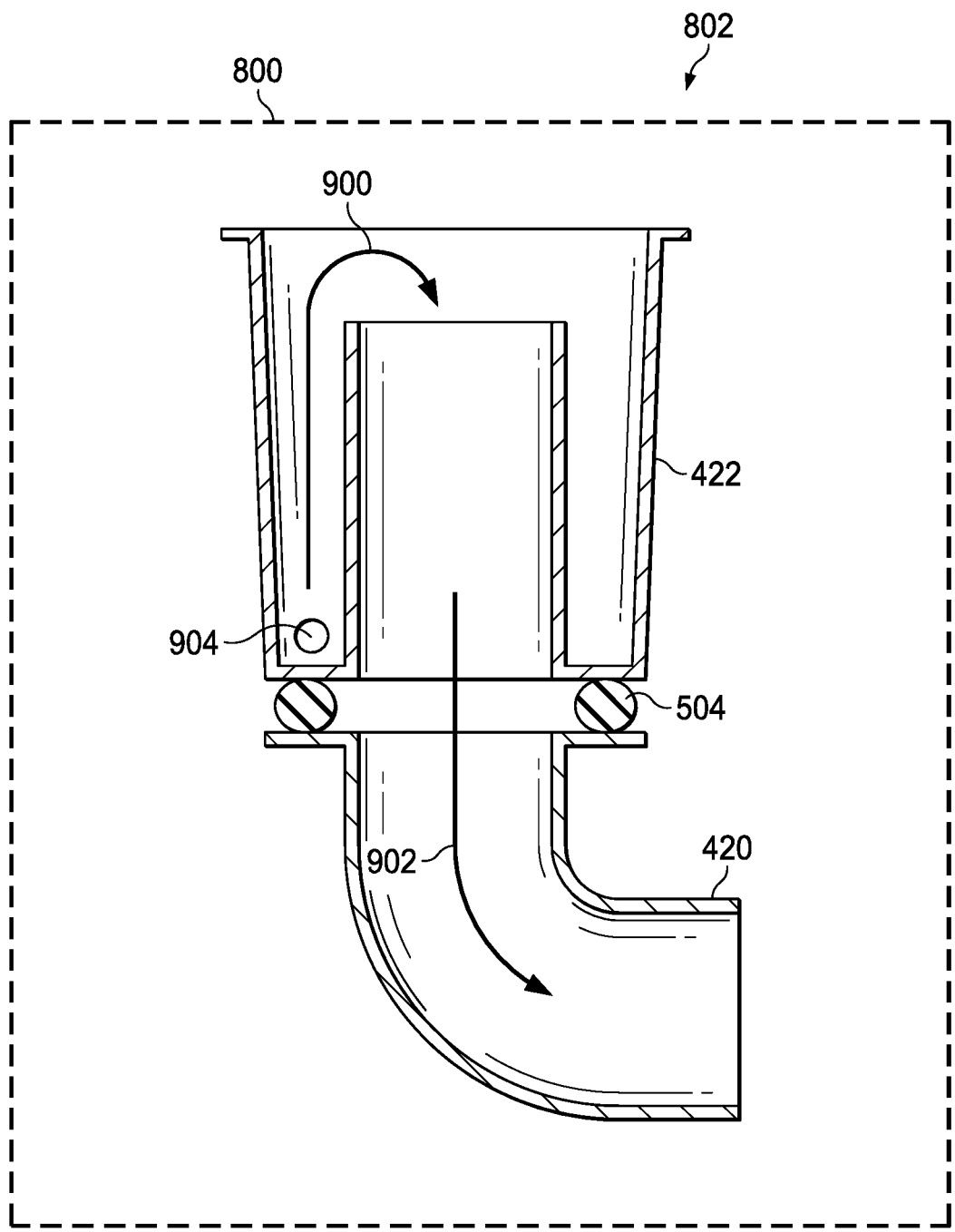
FIG. 9 is an inboard facing view of a section cut formed by a butt line plane through the passive particle separation system illustrated in FIG. 8 in accordance with embodiments described herein.

FIG. 9 is an inboard facing view of the section cut 802 formed by the butt line plane 800 through the passive particle separation system illustrated in FIG. 8 in accordance with embodiments described herein. In particular, FIG. 9 illustrates the system 406, seal 504, and inlet air duct 420 as illustrated in FIG. 8. FIG. 9 further illustrates the airflow path and passive particle separation features of the system 406. Referring to FIGS. 7 and 9, the airflow 708 continuing into the area 710 around the standpipe 424 must flow up to the top of the standpipe, as represented by an arrow 900, to exit the system 406, as represented by an arrow 902, into the inlet duct 420 via the standpipe. As the air flows up, as represented by the arrow 900, certain entrained particles lack sufficient inertia to remain entrained and drop out of the air stream. The particles no longer entrained in the air fall to the bottom of the housing 422 at the base of the standpipe 424 and accumulate in an area defined herein as a "trash trap" 904, which is disposed at the base, or bottom, of the housing. To access the accumulated debris, the standpipe 424 is removed and access is provided into the housing 422 via area from which the standpipe has been removed. Particle separation is complete as the air exits the system 406, as represented by the arrow 902, into the consumer system inlet duct 420. Some droplets and particles that have fallen into the trash trap 904 around the base of the standpipe 424 or have dropped out of the air stream in the expanding inlet area 702 exit the system through the drain (not shown in FIG. 9); debris that does not exit through the drain must be cleaned periodically. Cleaning of the debris is facilitated by removal of the standpipe 424, thereby providing access to the trash trap 904.

Referring again to FIGS. 4A-4C, the inlet outer housing 422 includes a flange section that matches profile with the underside of the fairing 400. In order to reduce the cost and weight of the inlet outer housing 422, a preferred manufacturing process produces a profile with a rather loose tolerance. In addition, a preferred process of manufacturing the fairing 400 produces an "uncontrolled" bottom side surface that itself has no profile tolerance controls, so when components 422 and 400 are mated together, some gaps therebetween may exist. To join the components, a large, thick bead of urethane-based adhesive may be applied to the top of the flange section of the inlet outer housing 422 by which the inlet outer housing is secured to the underside of the fairing 400, positioned via to indexing holes that are common to both components. In certain embodiments, while the adhesive is still uncured, a plurality of rivets may be installed along that flange surface to effectively join inlet outer housing 422 and fairing 400 together and squeeze out excess adhesive. After the adhesive is cured, the result is an airtight joint between the two components that is structurally supported by a mixture of adhesive and mechanical fasteners In various embodiments, various components and elements described herein may be constructed of a variety of materials, including but not limited to sheet metal aluminum, titanium, Corrosion RESistant steel ("CRES"), compression molded carbon fiber, fiberglass, and/or hand lay-up carbon fiber, and other plastics and steels, and may be fabricated using processes including but not limited to 3D printing, blow molding, hydroforming, injection molding, casting, rotational molding, and vacuum forming, Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. A rotorcraft comprising:
a first fairing; and
a passive particle separation system installed on the first fairing, the passive particle separation system comprising:
a plenum;
an inlet for feeding outside air into the plenum, wherein the outside air has particles entrained therewith;
a housing for enclosing the plenum; and
a standpipe installed on the housing;
wherein the outside air enters the plenum via the inlet; and
wherein the plenum, housing, and standpipe interact to impact the outside air entering the plenum to cause the particles to be released from the outside air;
wherein the plenum comprises an area adjacent the inlet that has a cross-sectional area greater than that of the inlet such that the outside air entering the inlet expends into a larger volume;
wherein the plenum is arranged such that the outside air must change direction as it flows from the are toward the standpipe;
wherein the housing comprises a cylindrical area around the standpipe arranged such that the outside air continues to flow into the cylindrical area where it encounters additional direction changes such that rotation is imparted to the outside air flow; and
wherein the first fairing is pivotably attached to a fixed fairing for articulation relative to the fixed fairing between a closed position and an open position.

2. The rotorcraft of claim 1, wherein the passive particle separation system further comprises a filter through which the outside air is drawn into the standpipe.

3. The rotorcraft of claim 1, wherein the passive particle separation system further comprises a trash trap disposed at the base of the housing around the standpipe for accumulating particles released from the outside air.

4. The rotorcraft of claim 1 wherein the standpipe is removable.

5. The rotorcraft of claim 1, wherein the passive particle separation system further comprises a consumer system inlet duct through which the outside air from which particles have been separated exits the passive particle separation system.

6. The rotorcraft of claim 1 further comprising a drain disposed at a bottom of the plenum proximate the standpipe.

7. The rotorcraft of claim 1 further comprising a seal disposed at a base of the standpipe.

8. The rotorcraft of claim 1, wherein the inlet comprises a National Advisory Council on Aeronautics ("NACA") type flush low-pressure inlet.

9. A rotorcraft comprising:
a fairing assembly comprising:
a first fairing affixed to an airframe of the rotorcraft;
a second fairing hinged on the first fairing for articulation relative to the first fairing between a closed position and an open position;
a passive particle separation system installed on the first fairing, the passive particle separation system comprising:
a plenum;
an inlet for feeding outside air into the plenum, wherein the outside air has particles entrained therewith;
a housing for enclosing the plenum; and
a standpipe installed on the housing;
wherein the outside air enters the plenum via the inlet; and
wherein the plenum, housing, and standpipe interact to impact the outside air entering the plenum to cause the particles to be released from the outside air;
wherein the plenum comprises an area adjacent the inlet that has a cross-sectional area greater than that of the inlet such that the outside air entering the inlet expends into a larger volume;
wherein the plenum is arranged such that the outside air must change direction as it flows from the are toward the standpipe; and
wherein the housing comprises a cylindrical area around the standpipe arranged such that the outside air continues to flow into the cylindrical area where it encounters additional direction changes such that rotation is imparted to the outside air flow.

10. The rotorcraft of claim 9, wherein the passive particle separation system further comprises:
a filter through which the outside air is drawn into the standpipe; and
a trash trap disposed at the base of the housing around the standpipe for accumulating particles released from the outside air.

11. The rotorcraft of claim 9, wherein the standpipe is removable.

12. The rotorcraft of claim 9, wherein the passive particle separation system further comprises a consumer system inlet duct through which the outside air from which particles have been separated exits the passive particle separation system.

13. The rotorcraft of claim 9, wherein the passive particle separation system further comprises a drain disposed at a bottom of the plenum proximate the standpipe.

14. The rotorcraft of claim 9, wherein the passive particle separation system further comprises a seal disposed at a base of the standpipe.

15. The rotorcraft of claim 9, wherein the inlet comprises a National Advisory Council on Aeronautics ("NACA") type flush low-pressure inlet.

\* \* \* \* \*